United States Patent [19]

Misko

[11] Patent Number: 4,594,804
[45] Date of Patent: Jun. 17, 1986

[54] CRAB TRAP

[76] Inventor: Michael G. Misko, 3610 Solly Ave., Philadelphia, Pa. 19136

[21] Appl. No.: 620,860

[22] Filed: Jun. 15, 1984

[51] Int. Cl.⁴ ............................................. A01K 69/10
[52] U.S. Cl. ..................................................... 43/105
[58] Field of Search ........................... 43/105, 102, 100

[56] References Cited

U.S. PATENT DOCUMENTS

| | | | |
|---|---|---|---|
| 2,787,861 | 4/1957 | Hansen | 43/102 |
| 2,918,749 | 12/1959 | Portner | 43/102 |
| 3,055,139 | 9/1962 | Condello | 43/61 |
| 3,508,358 | 4/1970 | Lee | 43/105 |
| 3,828,461 | 8/1974 | Roberts | 43/102 |
| 4,050,182 | 9/1977 | Basile | 43/105 |
| 4,092,797 | 6/1978 | Azurin | 43/105 |
| 4,141,172 | 2/1979 | Prosol | 43/105 |
| 4,272,904 | 6/1981 | Francklyn | 43/4.5 |
| 4,406,083 | 9/1983 | Hart | 43/105 |

Primary Examiner—Gene P. Crosby
Attorney, Agent, or Firm—Benasutti and Murray

[57] ABSTRACT

A crab trap includes a trap portion and a pneumatic actuator and control apparatus with a predetermined length of flexible, hollow tubing connected therebetween. The trap portion includes at least one clam shell-shaped trap cover which is held in an open position by a pivoting latch. To release the trap cover from the open position, the user squeezes a bladder contained within the pneumatic actuator and control apparatus, thereby inflating a bladder in the latch. As the latch bladder inflates, the latch pivots upwards, ultimately releasing the trap cover which then snaps to the closed position. The flexible tube is used to raise and lower the trap portion as well as to provide a pneumatic conduit between the actuator and the trap portion.

9 Claims, 6 Drawing Figures

CRAB TRAP

BACKGROUND OF THE INVENTION

The present invention pertains to fishing apparatus, and more particularly to an improved crab trap.

Prior art crab traps include those having substantially rectangular structures constructed of a wire mesh having four sides which drop to an open position upon lowering the crab trap to the bottom of a body of water. Bait is affixed therein and the crabs are theoretically able to enter the interior of the trap through one of the open side areas. Lifting the trap is supposed to cause the sides to raise to their closed positions thereby trapping the crabs which are feeding upon the bait.

In actual use, side areas will many times not drop to the open position due to tangling of the lines to which they are attached. Furthermore, in some instances, even if all four sides do not drop to the open position, a subsequent tangling of the lines may likely prevent one or more of the sides from being withdrawn to the closed position upon lifting and thereby permitting the crabs to escape the trap.

In an attempt to overcome the problems created by the failure of the sides to lower to the open position, other prior art crab traps included trap doors which are spring loaded into the open position prior to lowering the trap to the bottom of the body of water. Although an improvement over the other type of crab trap, this trap still utilizes a line for operating the trap door release mechanism, which line is prone to entanglement with itself and other elements of the trap.

The present invention obviates the above described problems by providing an apparatus having at least one spring loaded trap cover which positively swings from an open position to a closed position upon release by a pneumatically operated release mechanism. The pneumatically operated release mechanism is connected to a pneumatic release activator by means of a length of flexible tubing in the preferred embodiment.

Prior to lowering into the body of water, the spring loaded trap cover is set in the open position. The apparatus is then lowered into the body of water by means of a lowering device which pays out the flexible tubing. The crab trap is lowered to the bottom of the body of water and the user awaits the entry of crabs therein. After a predetermined wait, the user operates the pneumatic activator which causes operation of the pneumatically activated release means which releases spring loaded trap covers from its preset open position to the closed position. All crabs located under the trap covers will be immediately trapped thereby. The trap is then raised from the body of water by means of the flexible tubing.

Therefore, it is one object of the present invention to provide an improved crab trap which minimizes the possibility of faulty operation due to entanglement of the attached line.

It is a further object of the present invention to provide an improved crab trap having a trap cover which immediately closes upon the pneumatic activation of a pneumatically operated release device.

It is yet another object of the present invention to provide an improved crab trap in which the trap cover can be preset to the open position prior to lowering the trap to the bottom of the body of water by means of a flexible pneumatic tube.

It is still a further object of the present invention to provide an improved crab trap having a trap cover which is spring loaded and immediately snaps to the closed position upon activation of the pneumatically operated release device.

BRIEF DESCRIPTION OF THE DRAWINGS

Other objects, features and advantages of the present invention will become more fully apparent from the following detailed description of the preferred embodiment and the accompanying drawing in which.

DETAILED DESCRIPTION OF THE PREFERRED EMBODIMENT

Figure 1:
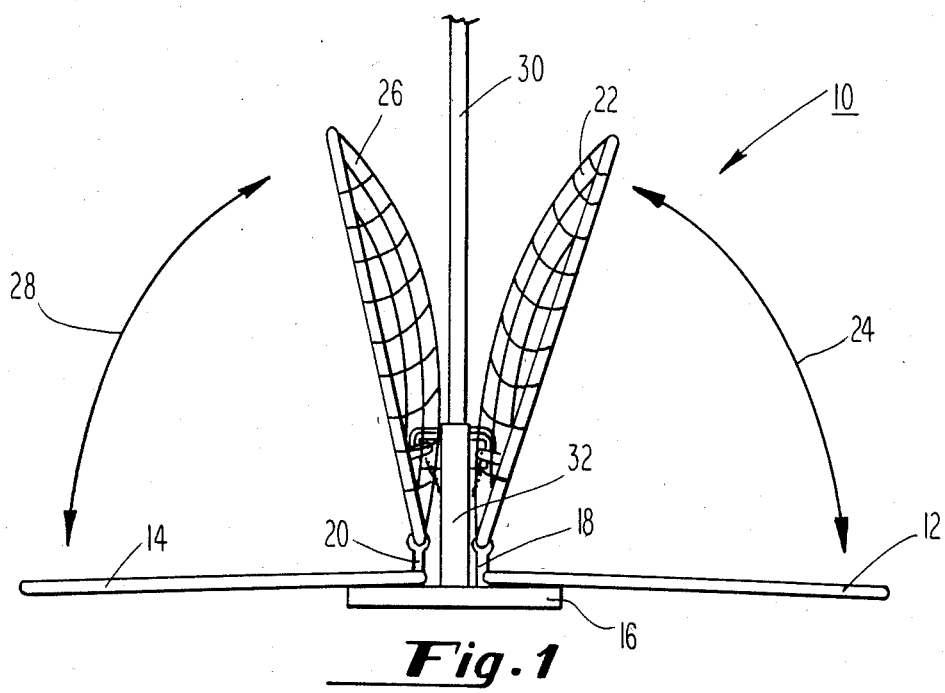
FIG. 1 is a side elevational view of the preferred embodiment of the improved crab trap in accordance with the present invention.

Referring now to FIG. 1, there is shown a preferred embodiment of a trap portion 10 of the improved crab trap of the present invention. The trap portion 10 comprises a first platform 12 and a second platform 14 connected to a central base plate 16, by suitable attachment means, for example first and second set of hinge clamps, 18 and 20 respectively.

A first trap cover 22 is connected to the central base plate 16 by the hinge portions of the first set of hinge clamps 8 in a pivoting fashion which permits the trap cover 22 to pivot between an open position, as shown in FIG. 1 and a closed position which is proximate and parallel to the first platform 12, in the directions indicated by double headed arrow 24. Similarly, a second trap cover 26 is connected to the central base plate 16 by the hinge portions of the second set of hinge clamps 20 in a manner which enables the second trap cover 26 to pivot between an open position shown in FIG. 1 and a closed position proximate and parallel to the second platform 14 in the direction shown by double headed arrows 28. A hollow, flexible tube 30, is connected to a manifold 72 disposed within a central housing 32. The other end of the tube 30 is connected to a pneumatic actuator and control apparatus generally designated 34 (see FIGS. 5 and 6).

Figure 2:
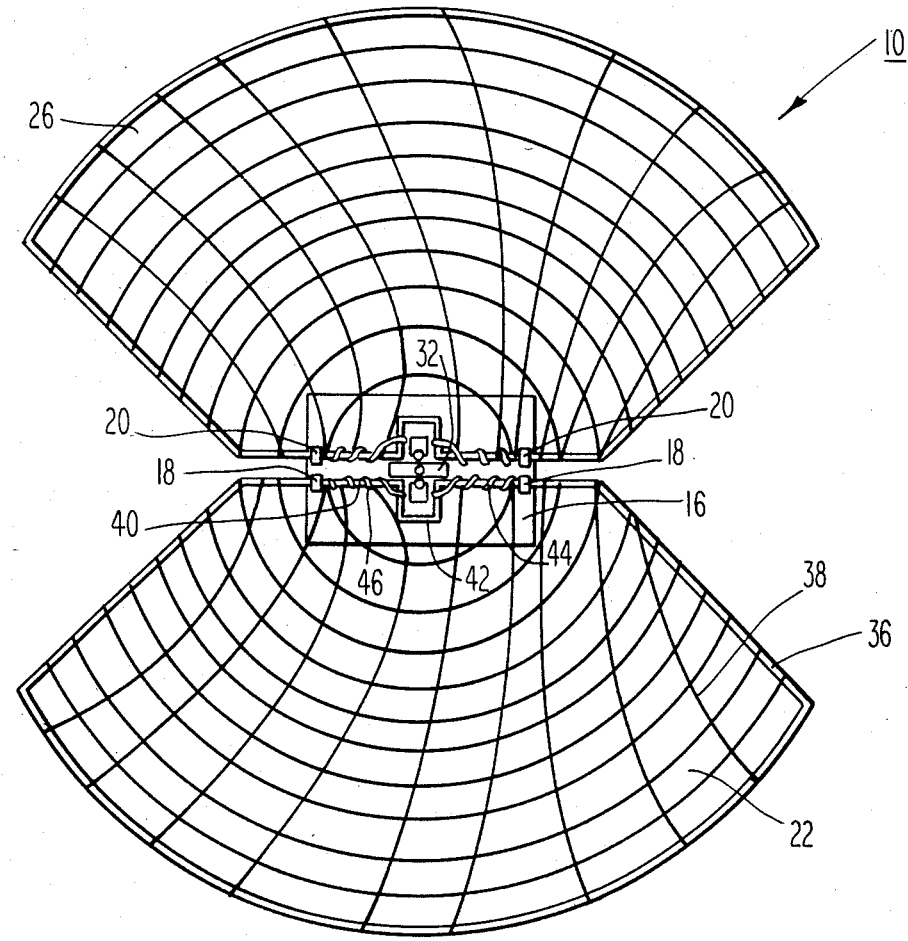
FIG. 2 is a top view of the preferred embodiment of the improved crab trap in accordance with the present invention.

Referring now to FIG. 2, the first trap cover 22 comprises a frame 36 to which is attached a mesh enclosure 38. It is preferred that the mesh enclosure 38 be constructed of intersecting segments of galvanized wire and that the enclosure have a convex or clam shell shape as more clearly shown in FIG. 1. The frame 36 includes a latching segment 40 which extends between the hinge clamps in the first set 18. The latching segment 40 includes a U-shaped portion 42 which is positioned substantially in the center of latching segment 40. A first spring 44 and a second spring 46 are coiled around the latching segment 40 of the frame member 36 on both sides of the U-shaped portion 42. One end of each spring is attached to the U-shaped portion 42 while the other end is attached to each hinge clamp in the first set 18. The purpose of the springs 44 and 46 is to bias the first trap cover 22 in the closed position which is proximate and parallel to the first platform 12. The second trap cover 26 is constructed and mounted to the central base plate 16 in a manner similar to that described for the first trap cover 22 as can be clearly seen in FIG. 2.

Figure 3:
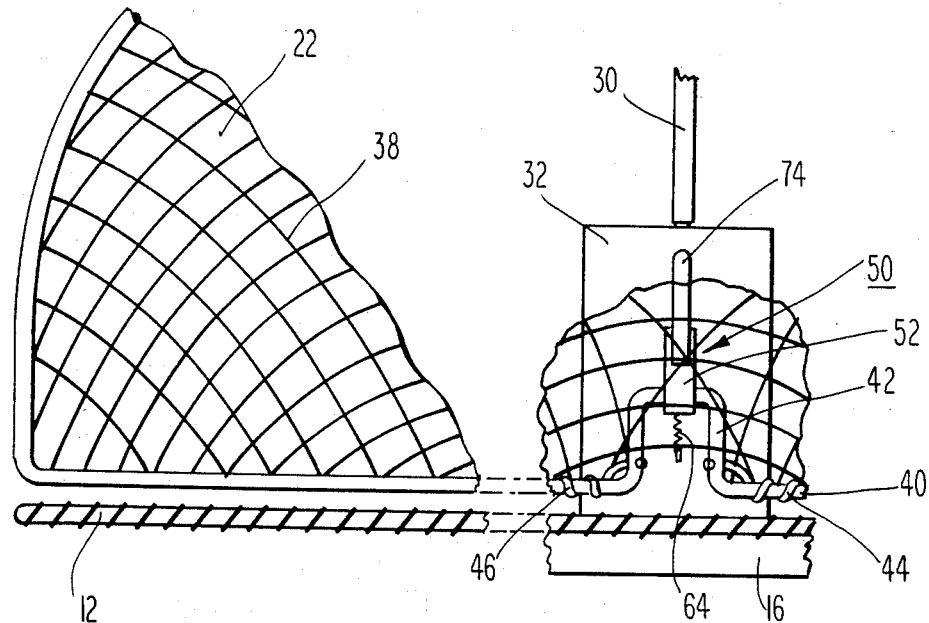
FIG. 3 is a partially sectioned side view of the improved crab trap depicted in FIGS. 1 and 2.
Figure 4:
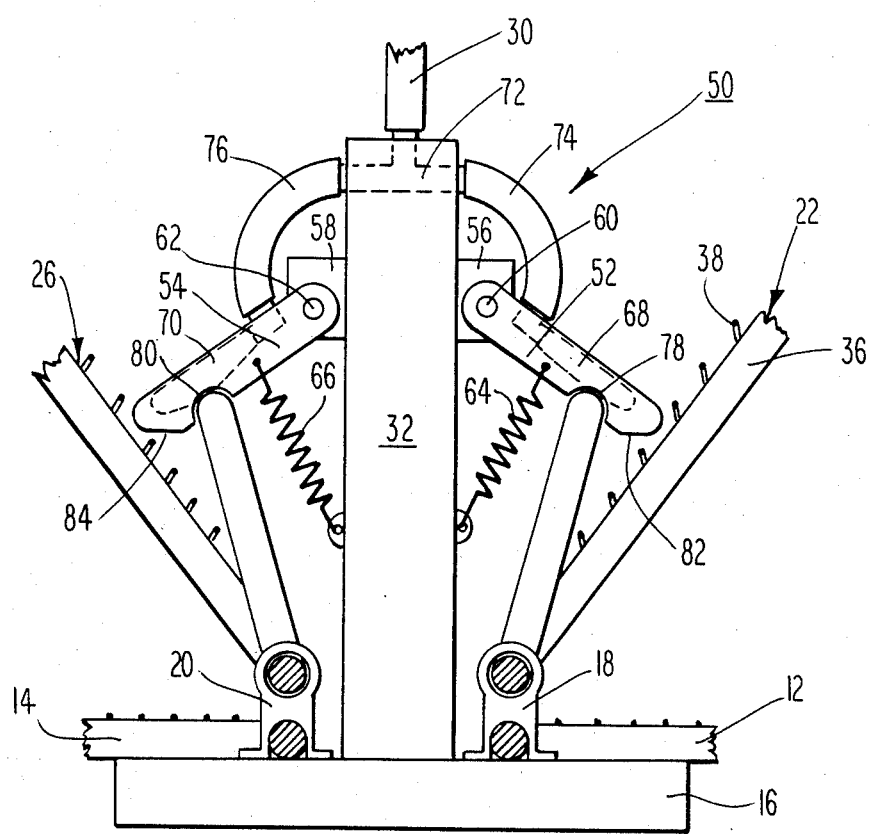
FIG. 4 is a partially sectioned side view of the pneumatically operated release device of the improved crab trap in accordance with the present invention.

Referring now to FIGS. 3 and 4, there is shown the preferred embodiment of a pneumatically operated release mechanism generally referred to as 50. The release mechanism 50 includes the central housing 32 having a first 52 and second 54 latch pivotally connected thereto by means of first 56 and second 58 pivot blocks having first 60 and second 62 pivot pins extending therethrough into the first 52 and second 54 latches respectively. The first 52 and second 54 latches are biased downwardly towards the central housing 32 by means of first 64 and second 66 springs respectively. The first 52 and second 54 latches each contain an inflatable release member 68 and 70 respectively. The inflatable release members 68 and 70 are pneumatically connected to the manifold 72 by means of flexible tubes 74 and 76 respectively. The manifold 72 is pneumatically connected to the flexible tube 30.

Detents 78 and 80 are formed in the lower portions of the first and second latches 52 and 54 respectively. Angled camming surfaces 82 and 84 are formed at the end of latches 52 and 54 respectively.

Figure 5:
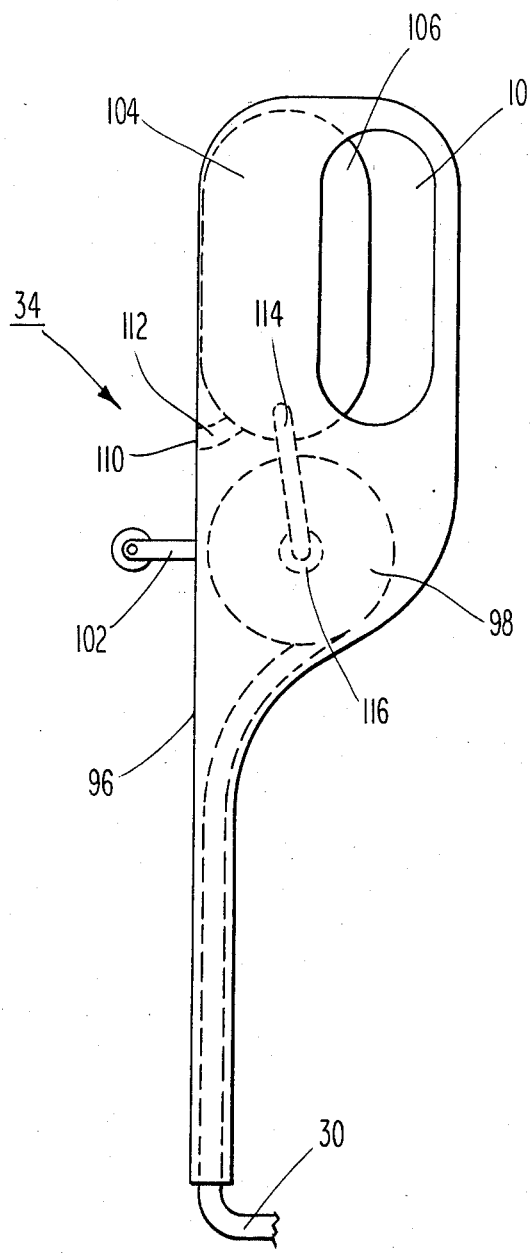
FIG. 5 is a side elevational view of a preferred embodiment of a pneumatic actuator and control apparatus of the improved crab trap of the present invention.
Figure 6:
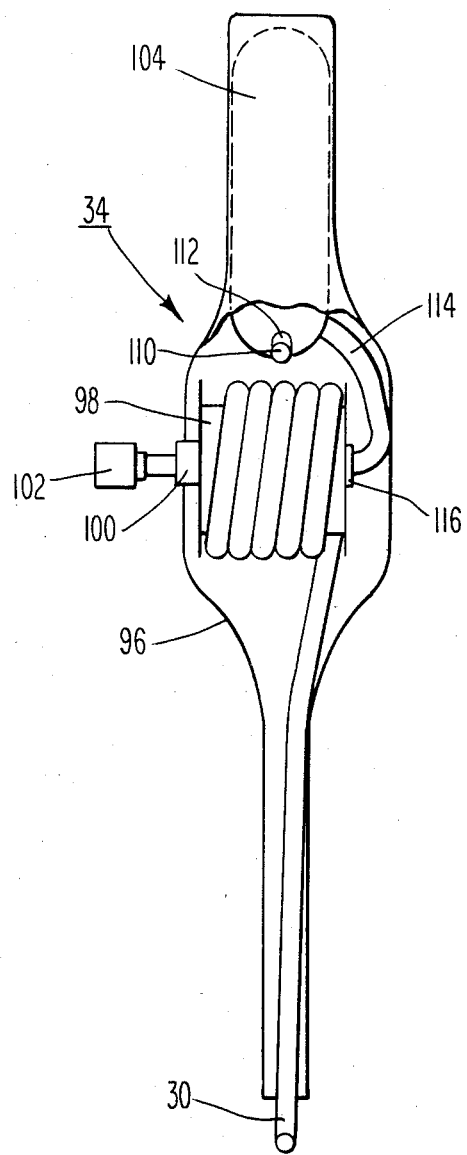
FIG. 6 is a partially sectioned top view of the pneumatic actuator and control apparatus of the improved crab trap in accordance with the present invention.

Referring now to FIGS. 5 and 6, there is shown the preferred embodiment of the pneumatic actuator and control apparatus 34 of the improved crab trap of the present invention. The apparatus 34 comprises a housing 96 which is preferably constructed of a plastic material, for example high impact polypropylene or high impact polystyrene. A reel mechanism 98, is rotatably mounted within the housing 96 by means of a bearing 100 which extends through the housing 96. A rotatable reel handle 102 is connected to the reel 98 whereby a rotation of the reel handle 102 causes the reel 98 to be rotated in either direction about its axis. It should be noted that the reel 98 may include a ratchet mechanism which permits the reel to be rotated in one direction only by the handle 102, with a release which enables the reel to be rotated in either direction or to be released from engagement with the handle 102 as is well known in the fishing reel art.

The housing 96 also contains a squeezable bladder 104. At least one portion 106 of the squeezable bladder 104 extends into an opening 108 in the housing 96. The squeezable bladder 104 is in pneumatic communication with a vent hole 110 by means of a first section of tubing 112. One end of a second section of tubing 114 is in pneumatic communication with the interior of the squeezable bladder 104. The other end of tubing 114 is connected to a pneumatically sealed, rotating slip connector 116 which provides pneumatic communication to the interior of the reel 98. The rotating slip connector 116 maintains a sealed pneumatic connection between tubing 114 and a section of tubing (not shown), which is mounted within the reel 98. The tubing within the reel 98 provides a pneumatic connection between the rotating slip connector 116 and the flexible tube 30. Consequently, pneumatic communication is maintained between the flexible tube 30 and the interior of the squeezable bladder 104 by means of the tubing within reel 98, the rotating slip connector 116, and tubing 114, regardless of which position the reel 98 has been rotated to.

The crab trap of the present invention operates as follows. Prior to placement of the trap portion 10 into the water, the first 22 and second 26 trap covers are set in their open positions by withdrawing each upward, away from the bottom platforms 12 and 14. This upward motion will cause the U-shaped section 42 of each crab trap cover to engage the angled camming surfaces 82 and 84 of the latches 52 and 54 respectively. This engagement causes the latches to raise upwardly, away from the central housing 32. Continued upward movement of each crab trap cover causes the detent 78 and 80 in the latches 52 and 54 to engage the U-shaped sections 42 of the respective trap covers 22 and 26. Upon engagement, the springs 64 and 66 operate to bias the latches 52 and 54 respectively downwardly thereby retaining the U-shaped sections 42 within the detends 78 and 80.

Bait is fastened as required to the first and second platforms 12 and 14 respectively. The trap portion 10 is then lowered into the water by means of unwinding the flexible tube 30 from the reel 98 in the pneumatic actuator and control apparatus 34. As previously stated, the lowering can be accomplished by releasing the ratchet mechanism or by operating the handle 102 causing a pay out of the unwinding flexible tube 30. The trap portion 10 is lowered until it reaches the bottom of the body of water.

After waiting for a reasonable period of time to permit the crabs to feed on the attached bait, the user grasps the activating mechanism 34 by placing his fingers through the opening 108 and his thumb across the vent opening 110. To release the trap covers 22 and 26 from their set positions, the user squeezes the squeezable bladder 104 by pressing against the exposed portion 106 with his fingers, while at the same time sealing the vent opening 110 with his thumb. The purpose of the vent opening 110 is to prevent inadvertent release of the trap covers while lowering the trap portion or otherwise handling the pneumatic actuator and control apparatus 34.

Squeezing the squeezable bladder, while sealing the vent opening 110, causes air to be forced into the flexible tube 30 through the tubing 114, the rotating slip connection 116 and the tubing located in the reel 98. The air is forced down through the flexible tube 30 into the manifold 72 and thereafter into the flexible tubes 74 and 76. This air is subsequently forced into the inflatable release member 68 and 70 of the latches 52 and 54 respectively.

Inflation of the inflatable release members 68 and 70 forces the latches 52 and 54 upwardly, away from the U-shaped sections 42 of the trap covers 22 and 26. This action disengages the U-shaped sections 42 from the detents 78 and 80 thereby releasing the spring biased trap covers to their closed positions, entrapping any crabs which are feeding on the bait attached to the bottom platforms 12 and 14.

If used, the ratchet mechanism of the actuating device 34 is adjustable such that rotation of the handle 102 will cause the reel 98 to wind in the flexible tubing 30 which in turn causes the trap portion 10 to be withdrawn from the body of water. The crabs are released by resetting the trap covers to their opened positions as previously described. At this time the crab trap is again ready for use. From the above description, it can be seen that the crab trap of the present invention enables the quick and positive entrappment of crabs without entangling lines and concomitent fouling and faulty operation inherent in the prior art crab traps.

While the principles of the invention have now been made clear in an illustrative embodiment, there will be apparent to those skilled in the art, many modifications of structure, arrangement, elements, material, and components used in the practice of the invention and otherwise, which are particularly adapted for specific environments and operating requirements without departing from those principles. The appended claims are, therefore, intended to cover and embrace any such modifications within the limits only of the true spirit and scope of the invention.

I claim:

1. A marine animal trap with pneumatic actuation comprising:
   (a) trap means including:
      (1) at least one trap cover operable between an open and a closed position;
      (2) means for biasing said trap cover in said closed position;
      (3) means for releasably retaining said trap cover in said open position, said retaining means being pneumatically activatable by means for releasing said trap cover from said open position;
   (b) actuating means for pneumatically activating said trap cover retaining means; and
   (c) means for providing pneumatic communication between said actuating means and said activatable means of said trap cover retaining means.

2. A trap in accordance with claim 1 additionally comprising control means for controlling the raising and lowering of said trap means.

3. A trap in accordance with claim 2 wherein said pneumatic communication means comprises a predetermined length of flexible, hollow tubing.

4. A trap means in accordance with claim 3 wherein said control means comprises reel means, adapted to receive said hollow flexible tubing therearound, for reeling in and paying out 5. A trap in accordance with claim 4 wherein said means for biasing said trap cover in said closed position comprises at least one spring.

6. A trap in accordance with claim 5 wherein said retaining means comprises:
   (a) latch means, pivotally operable between a latched position and a release position;
   (b) means for biasing said latch means in said latched position;
   (c) detent means disposed in said latch means for retaining at least a portion of said trap cover therein when said latch means is in said
   (d) an inflatable bladder disposed within said latch means, for exerting, upon inflation, a force against said trap cover portion causing said latch means to move to said release position thereby releasing said portion of said trap cover.

7. The trap in accordance with claim 6 wherein said actuating means comprises a squeezable bladder.

8. A trap in accordance with claim 7 wherein said actuating means additionally comprises sealable vent means for preventing inadvertent actuation of said trap cover release 9. The trap in accordance with claim 8 wherein said trap means comprises two trap covers.

* * * * *

UNITED STATES PATENT AND TRADEMARK OFFICE
CERTIFICATE OF CORRECTION

PATENT NO. : 4,594,804
DATED : June 17, 1986
INVENTOR(S) : Michael G. Misko

It is certified that error appears in the above-identified patent and that said Letters Patent is hereby corrected as shown below:

In column 2, line 41, number "8" should be --18--.

In column 6, line 10, add, following the words "paying out", the words --said tubing.--

In column 6, line 22, add, following the words "in said", the words --latched position;--

In column 6, line 33, add, following the word "release" the word --means.--

Signed and Sealed this

Ninth Day of September 1986

[SEAL]

Attest:

DONALD J. QUIGG

Attesting Officer

Commissioner of Patents and Trademarks